No. 846,703. PATENTED MAR. 12, 1907.
F. W. SPRINGER.
SYSTEM FOR THE SUPPLY OF CURRENT DEMANDS.
APPLICATION FILED SEPT. 17, 1906.
2 SHEETS—SHEET 1.
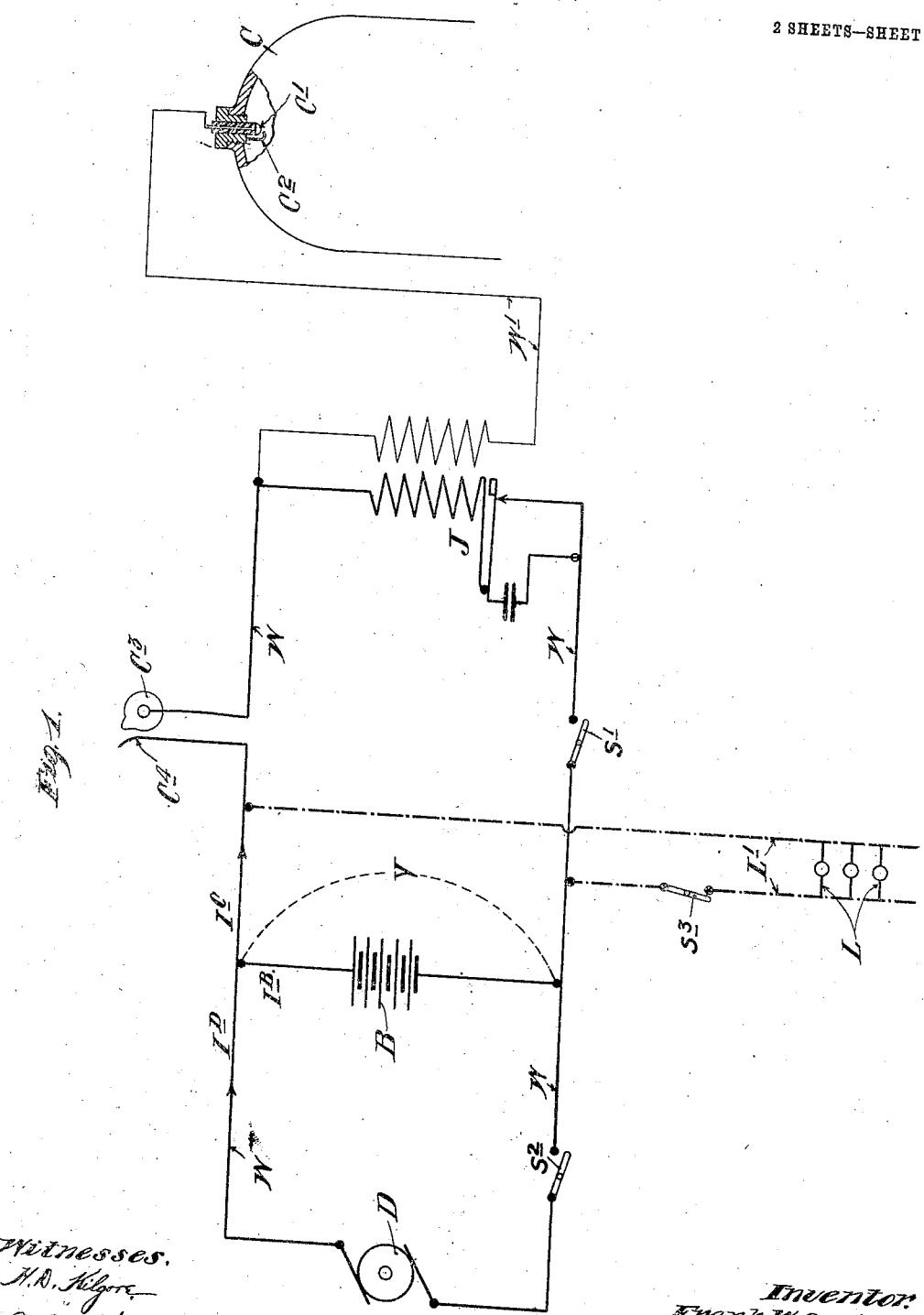
Witnesses.
H. D. Kilgore.
A. H. Opsahl.
Inventor:
Frank W. Springer.
By his Attorneys.
Williamson and Merchant No. 846,703. PATENTED MAR. 12, 1907.
F. W. SPRINGER.
SYSTEM FOR THE SUPPLY OF CURRENT DEMANDS.
APPLICATION FILED SEPT. 17, 1906.
2 SHEETS—SHEET 2.
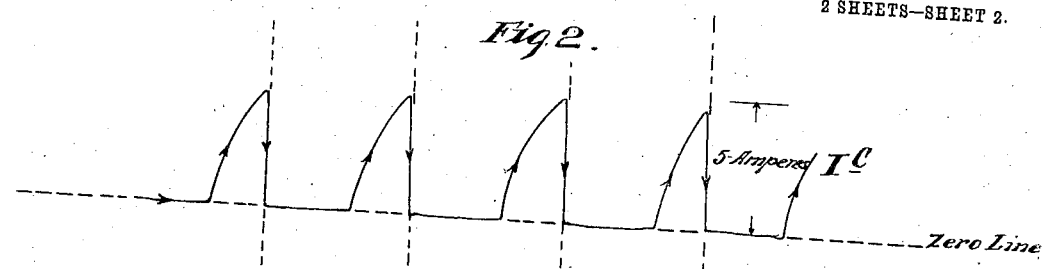
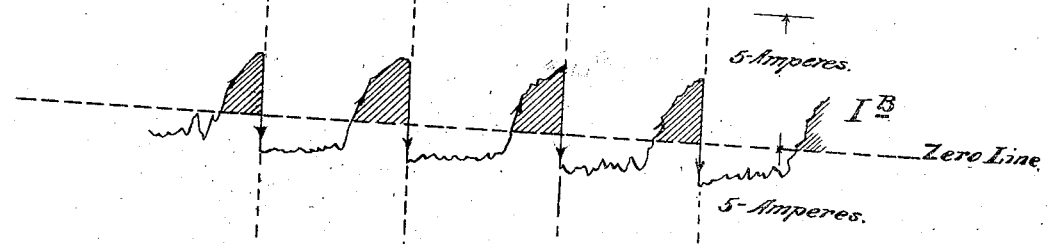
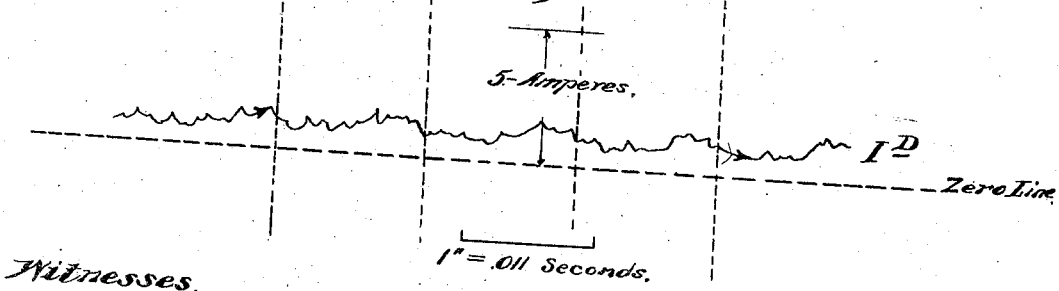
Witnesses.
H.O. Klyve
A. H. Opsahl.
Inventor,
Frank W. Springer,
By his Attorneys,
Williamson & Merchant

UNITED STATES PATENT OFFICE.

FRANK W. SPRINGER, OF MINNEAPOLIS, MINNESOTA.

SYSTEM FOR THE SUPPLY OF CURRENT DEMANDS.

No. 846,703.    Specification of Letters Patent.    Patented March 12, 1907.

Application filed September 17, 1906. Serial No. 335,032.

*To all whom it may concern:*

Be it known that I, FRANK W. SPRINGER, a citizen of the United States, residing at Minneapolis, in the county of Hennepin and State of Minnesota, have invented certain new and useful Improvements in Systems for the Supply of Current Demands; and I do hereby declare the following to be a full, clear, and exact description of the invention, such as will enable others skilled in the art to which it appertains to make and use the same.

My invention relates, broadly, to the improvement of systems for the supply of current demands in which primary cells or batteries are employed, and has for its especial object to improve ignition systems for explosive-engines.

In its broad or generic phase the invention relates not only to ignition systems for use in connection with explosive-engines or for other ignition purposes, but also relates to other apparatus, such as lighting appliances. For example, it may be employed in connection with launches and other conveyances impelled by explosive-engines and in which primary batteries are used for lighting as well as for ignition purposes. The current demands may thus be intermittent, fluctuating, pulsating, variable, or steady in character.

Primary cells or batteries are, as is well known, in extensive use in connection with ignition devices for explosive-engines, and especially in connection with so-called "jump-spark" ignition systems. Dynamos have also been extensively used in ignition systems for explosive-engines.

It has been proposed to use both a primary battery and dynamo in the same ignition system for an explosive-engine and to employ switch mechanism whereby the battery could be utilized in starting the engine and the dynamo-current could be utilized after the engine had acquired sufficient speed to cause the dynamo to generate a current of sufficient potential to produce the required spark. In such proposed arrangement, however, the actions of the primary battery and of the dynamo were independent—that is, there was no conjoint action between the two, or, otherwise stated, they were alternative devices arranged to produce the required spark at different times.

It is of course a well-known fact that primary cells under service quite rapidly deteriorate and become too weak to produce the required spark-producing current. This deterioration is known to be due largely to polarization, caused, for example, in the case of the common "dry cell" by the collection of hydrogen on the cathode or conducting-electrode of the cell. This free hydrogen in a new dry cell is taken off from the electrode with considerable rapidity by chemical combination with the depolarizing agents, in which the cathode is usually placed. There is always, however, even in case of a new cell, considerable loss in power of the cell, due to the counter electromotive force set up by the products of electrolysis of the discharging current and to the increased resistance due to the presence of free gas, as hydrogen, on the cathode. The quantity of hydrogen deposited varies directly with the quantity of current discharged, and in the special case cited for purposes of illustration the amount of the depolarizing agent used in absorbing the hydrogen varies approximately as the quantity of discharged current.

It is well known that the amount of polarization in any given primary cell depends upon the time and amount of current (amperes) flowing and the degree of exhaustion of the cell. It has also been known for some time that a polarized primary cell might be refreshed—*i. e.*, depolarized—by connecting it in a direct-current circuit in such a way as to send current through it in a direction opposite to that of the usual discharging current.

In a storage battery or reversible battery of the lead sulfuric acid type—for example, the products of electrolysis after appearing at the electrodes during charge and discharge are held within the cell by such chemical combination with the electrodes and electrolyte, so that the cell may be put through the electrochemical cycles of charge and discharge with days intervening without suffering any appreciable loss of the products of electrolysis. In primary batteries, often called "non-reversible" batteries in general, the products of electrolysis during discharge escape or are absorbed or otherwise enter into non-reversible chemical combinations after appearing at their respective electrodes—as, for example, the hydrogen at the cathode (carbon electrode) and the chemical depolarizing agents of a common dry cell. If, however, each small momentary discharge, each series of discharges, or a small quantity of discharge be followed by an approximately equal quantity of charging electricity, as hereinafter discussed in connection with the experiments, a large part of the products of electrolysis of discharge are caught in a nascent state before they have time to escape or enter into non-reversible chemical combinations and are put through some electrochemical cycles, so that a primary battery under the conditions of this invention may be operated with approximately the same efficiency as a common storage battery under the conditions hereinafter described.

In case the average (chemical) current passing in and out of the battery is not made exactly zero the same conditions will obtain in general and the life of the battery be prolonged or preserved. In case any demand is made upon the battery and the dynamo's supply is intermittent, fluctuating, or variable the same general conditions of operation will also obtain.

The best results will be obtained when every momentary discharge or small quantity of discharge is followed immediately by an approximately equal quantity (coulombs) of charging-current, and the smaller the time of discharge the higher will be the efficiency. It is not necessary, however, that the time between the discharging and charging periods should always be the merest fraction of a second, as a primary battery might be used under conditions where the charge-current occurs at intervals of minutes and not seconds and still give fairly good results. This, however, will depend to a large extent on the kind of primary battery used.

The above remarks apply in general to all primary batteries, although the polarizing agent is not hydrogen in all batteries.

In designing my invention I have had in mind these important facts—to wit, first, that if a primary battery could be depolarized to some extent at least following each momentary discharge or small quantity of discharge its life would be extended very greatly and that in any event its life would not be shortened by polarization, and, furthermore, that its maximum current-producing ability would be maintained and a smaller battery could be used; second, that if a dynamo or magneto of an ignition system for explosive-engines, for example, could be caused to constantly generate current and all or a large part of that current could be subsequently utilized to produce sparks for causing the explosion of the gas charge in the engine at the proper times a very much smaller dynamo could in that event be employed than under the present system, wherein the dynamo alone is used to produce the sparks.

With the above important objects in mind I discovered that the above-noted results and others could be obtained by connecting the dynamo and the primary cell or battery in multiple or parallel and with the coöperating parts so combined and arranged that the said dynamo and primary cell or battery would act together to supply the required current for the spark, and between sparks, or during the time intervening between the spark-producing electrical discharges, the dynamo-current would pass through the primary cell or battery in a direction reverse to the direction of the battery-discharge current, and thereby depolarize or refresh the said cell or battery.

Experiments which I have made in practice lead me to believe that with this arrangement the hydrogen ions (cathions) which move from the anode or generating-electrode to the cathode or conducting-electrode in the dry cell cited as an example are caught and driven backward before they have accumulated upon the electrode to such an extent as to materially reduce the power and life of the cell or battery.

One application of the invention is illustrated in the accompanying drawings, wherein—

Figure 1 is a diagrammatic view showing the improved system applied to intermittently supply current to the sparking electrodes of a single-cylinder explosive-engine; and Figs. 2, 3, 4, and 5 are views showing curves taken by means of an oscillograph under conditions hereinafter to be noted.

Referring to the diagrammatic view Fig. 1, the character C indicates the cylinder of an explosive-engine which is provided with the usual sparking electrodes C' and C². The character C³ indicates a rotary-engine-driven circuit maker and breaker, commonly called a "timer," and which coöperates with a contact C⁴. The timer C³ may be driven from the engine in the usual or any suitable way, it being of course understood that for a four-cycle engine it would be given one rotation for each two rotations of the engine crank-shaft, while for a two-cycle engine it would be given one rotation for each rotation of the engine crank-shaft.

The character D indicates an engine-driven dynamo, which may be of the magneto or any other suitable type. The character B indicates a battery made up of a plurality of cells, such as so-called "dry cells." The character J indicates diagrammatically a vibrating jump-spark coil of standard type, the construction and operation of which is well understood. The dynamo D and battery B are connected in mulitple or parallel and to the primary of the jump-spark coil J by means of wires W. The terminals of the circuit, including the wire W, extend from the engine-driven timer C³ to the coöperating contact C⁴, so that the primary circuit will be intermittently opened and closed under the rotation of the said timer C³.

The secondary of the jump-spark coil J is connected by a wire W′ to the sparking electrodes C′. It will be understood that the sparking electrode C² as well as the engine-driven timer C³ are grounded through the engine and that part of the secondary circuit is in the arrangement illustrated through the said timer C³ and through a portion of the circuit-wire W, this latter-noted feature being the customary arrangement.

The characters S′ and S² indicate switches in the primary circuit W. When the switch S² is opened, the sparking device is cut out of action, and when the switch S′ is closed and the switch S² is opened the dynamo only will be cut out of action.

The switch S² should be closed only when the voltage of the dynamo is greater than that of the battery and for this reason should be preferably electrically or mechanically automatically operated.

Where a second demand, such as a lighting system, is arranged to also take current from the supply system, it may be arranged as indicated in dotted lines in Fig. 1, wherein the character L indicates the translating devices, such as lamps, and L′ the wires connecting the same to the battery-wires W. The character S³ indicates a switch interposed in the circuit L′ for the purpose of cutting the lamps out of circuit when desired.

The curves shown in Figs. 2, 3, 4, and 5 were taken by means of an oscillograph while the spark-coil (indicated by the character J, Fig. 1) was in continuous operation and supplied conjointly by the battery B and dynamo D, Fig. 1.

Fig. 2 shows the oscillograph-record of the instantaneous values of the current at Iᶜ, Fig. 1. Fig. 3 shows a similar record of the voltage of the supply system at V. Fig. 4 shows the battery-current recorded by the oscillograph at Iᵇ, and Fig. 5 shows the dynamo-current record taken at Iᵈ. While the records were being taken the dynamo was so adjusted that the average value of the current, as measured by a permanent-magnet direct-current ammeter at Iᵇ, Fig. 1, was zero. This is also indicated by Fig. 4, in which the shaded parts of the curve show the discharging currents from the battery and the lower parts of Fig. 4, the reverse current passing into the battery from the dynamo. The average dynamo-current, as indicated by Fig. 5, equals the average current taken by the coil and indicated by Fig. 2.

It is to be noted that the curves shown in Figs. 2, 3, 4, and 5 were taken while the spark-coil was in continuous operation, which would correspond to the current demand made by an eight-cylinder four-cycle engine or a four-cylinder two (stroke) cycle engine in which the timer-contacts C³ and C⁴, Fig. 1, were made during twenty-five per cent. of one engine-revolution for each cylinder crank-shaft. All the above curves were taken with the switch S³ open.

I desire to here state that I consider within the broad scope of my invention and claim all systems of electrical distribution in which provision is made for intermittently sending a reverse electric current through a primary cell or battery for the purpose of intermittently depolarizing or refreshing the same. From this statement it will of course be understood that the electrical current for depolarizing the primary battery may be afforded by any suitable source of electricity. For instance, a thermopile might be used in place of a dynamo or dynamo-electric generator.

What I claim is—

1. The combination with a primary cell or battery, of means for intermittently sending a reverse current through said primary cell or battery, immediately following each battery discharge or series of battery discharges, to thereby depolarize the same.

2. The combination with a primary cell or battery, of means for intermittently sending a reverse current through said primary cell or battery, immediately following each battery discharge or series of battery discharges, to thereby refresh the same.

3. The combination with a primary cell or battery and a dynamo of relatively high potential, connected in parallel and arranged to coact to afford an intermittent or fluctuating current-supply, and means for intermittently opening and closing a demand-circuit of said apparatus, whereby, at times intervening current discharges, said dynamo will send reverse current through said primary battery and thereby intermittently depolarize or refresh the same.

4. The combination with an internal-combustion engine, of an ignition system therefor comprising a primary cell or battery, and engine-actuated source of electrical energy of relatively high potential, connected in parallel with said primary cell or battery, and means for intermittently opening and closing a demand-circuit of said ignition system, whereby reverse current will be sent through said battery, and said battery will be intermittently depolarized or refreshed, at times intervening discharges from said battery.

5. In an apparatus for affording a continuous and an intermittent current-supply, devices receiving intermittent supplies, devices receiving continuous supplies, and a primary cell or battery and a relatively high potential source of electrical energy connected in parallel and arranged to coact to produce the said intermittent and continuous current-supplies, and which high-potential source of electrical energy operates to intermittently send reverse current through said primary cell or battery, at times intervening the intermittent current discharges.

In testimony whereof I affix my signature in presence of two witnesses.

FRANK W. SPRINGER.

Witnesses:
MALIE HOEL,
F. D. MERCHANT.